Oct. 11, 1932.  C. H. BURRIS  1,882,405
FOUR-IN-ONE STEAM CYLINDER DRIER
Filed June 11, 1931  3 Sheets-Sheet 1
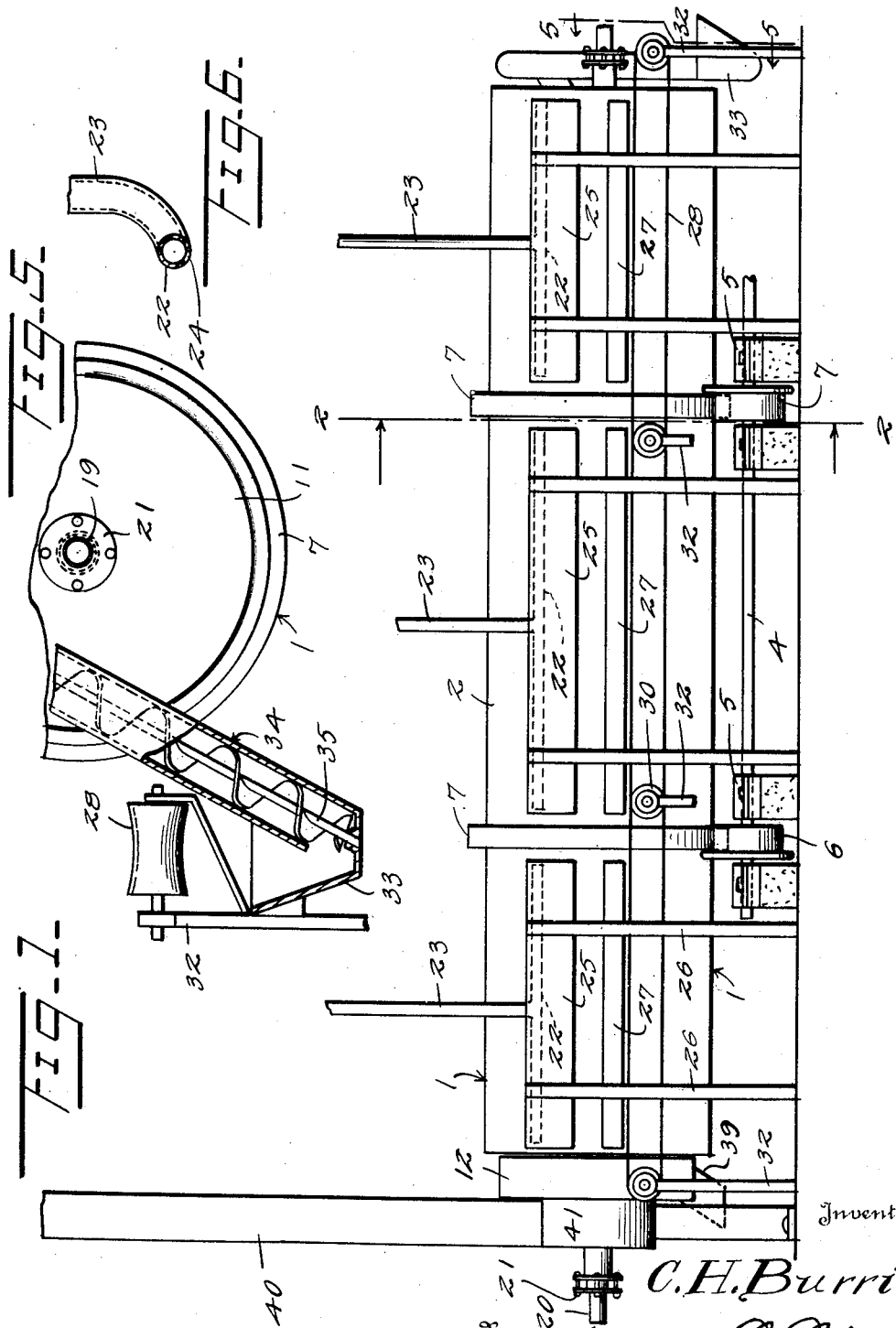

Oct. 11, 1932.    C. H. BURRIS    1,882,405
FOUR-IN-ONE STEAM CYLINDER DRIER
Filed June 11, 1931    3 Sheets-Sheet 2
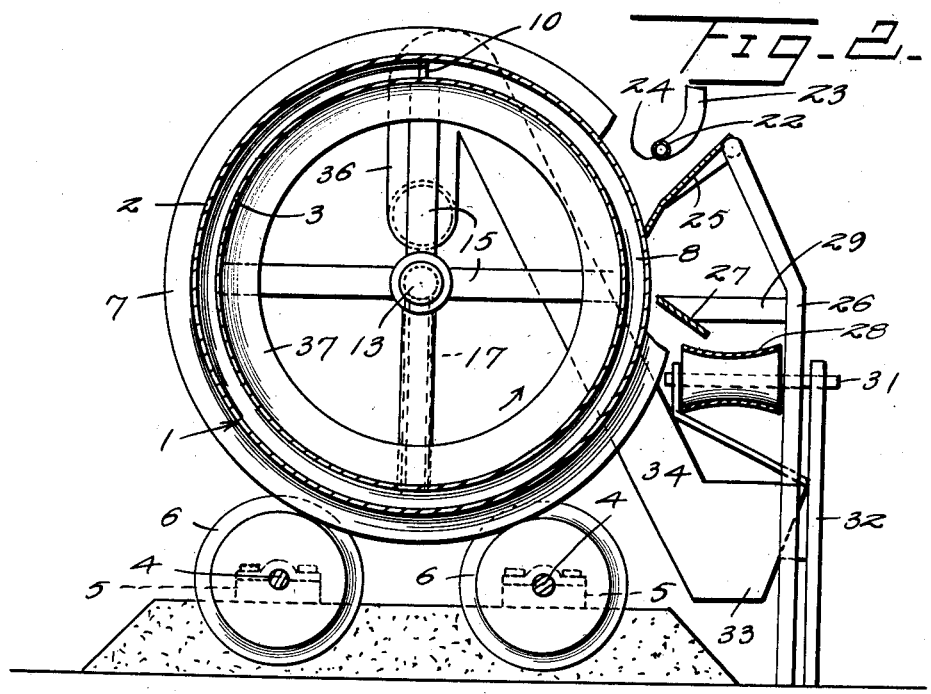
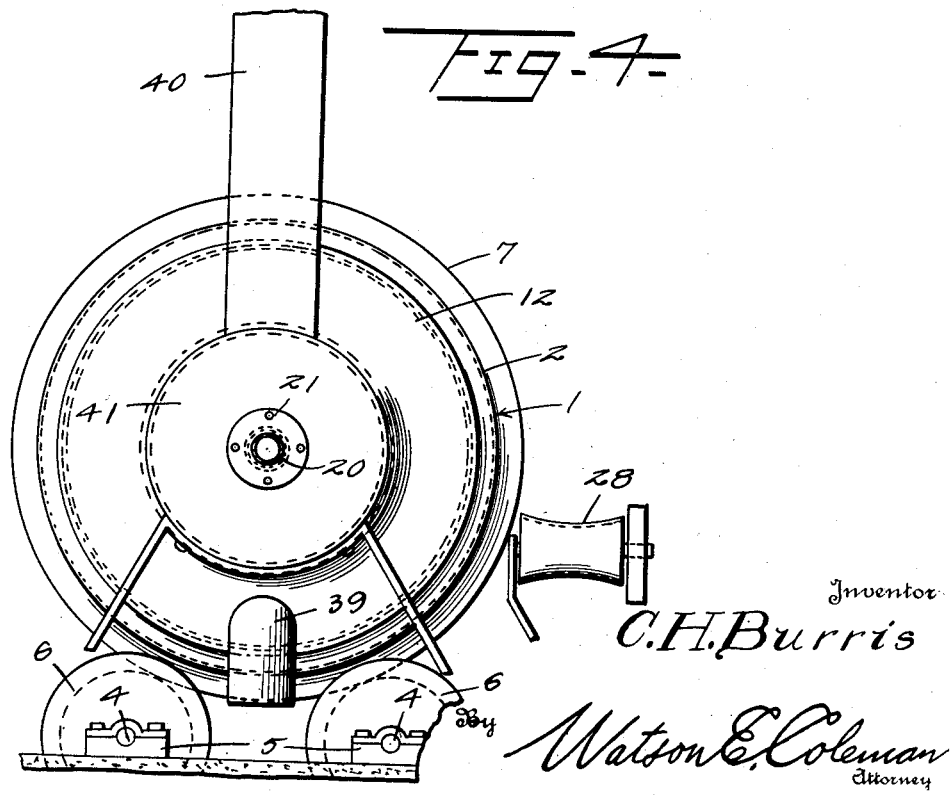
Inventor
C. H. Burris
By Watson E. Coleman
Attorney

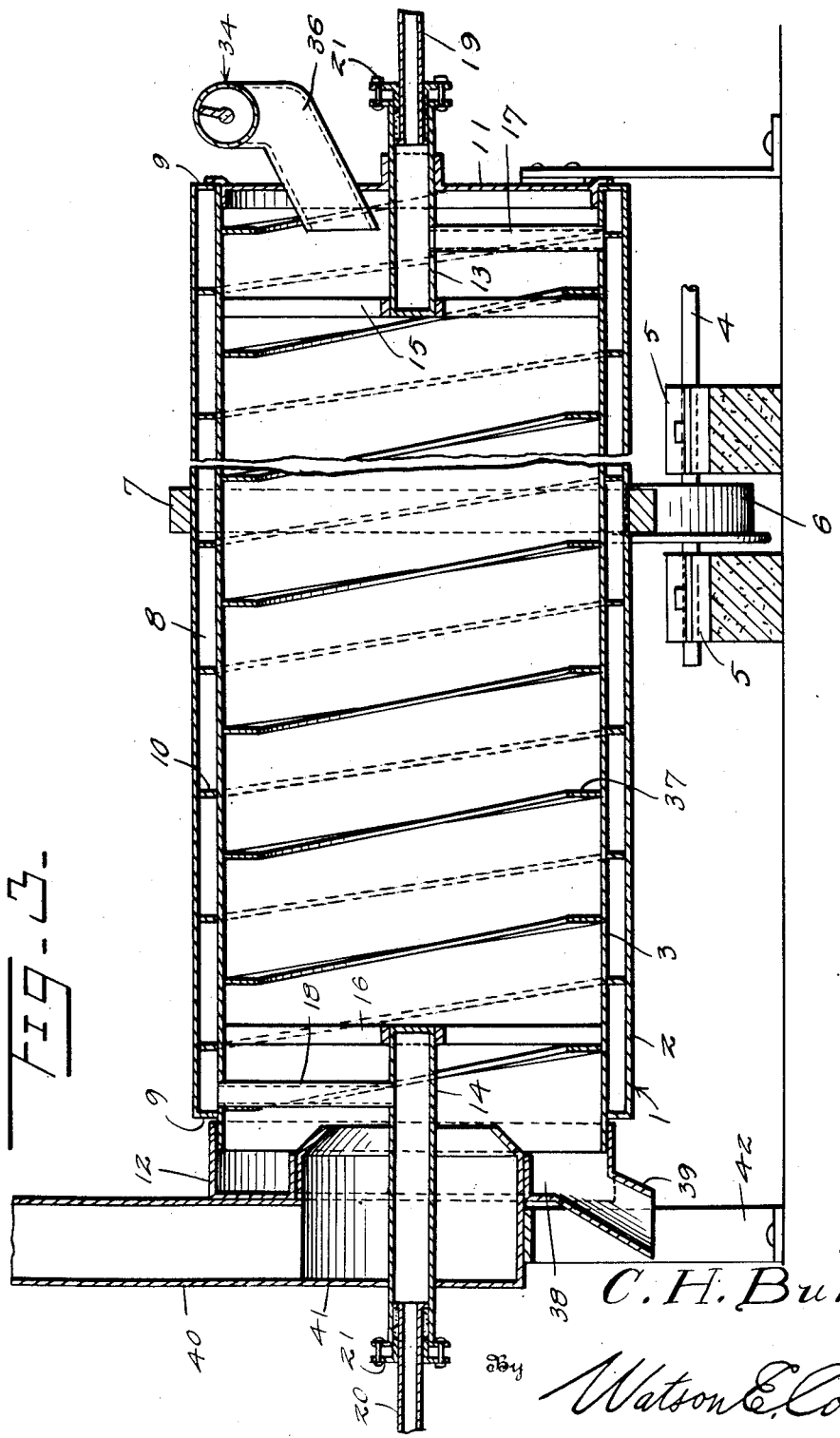

Patented Oct. 11, 1932

1,882,405

UNITED STATES PATENT OFFICE

CLAUD H. BURRIS, OF ROGERS, ARKANSAS

FOUR-IN-ONE STEAM CYLINDER DRIER

Application filed June 11, 1931. Serial No. 543,716.

This invention relates to drying machines, and has for one of its objects to provide a novel machine which shall be especially adapted to be used for the purpose of drying silica in a highly efficient manner and in a comparatively short time.

To attain the foregoing and other objects, the nature of which will appear as the description proceeds, the invention comprehends the provision of a drying machine which shall embody a horizontally disposed rotatable drum having relatively spaced inner and outer cylindrical walls heated by a medium passing through the space between the walls, means for rotating the drum, means for applying comminuted silica in paste like form to the outer surface of the outer wall at one side of the drum, means for removing the silica from the outer wall after the drum has made a substantially complete revolution, means for conveying the removed silica to the interior of the inner wall near one end of the drum, and means for feeding the silica along and in contact with the inner wall to the other end of the drum, substantially all of the moisture being removed from the silica while it is on the outer wall, and the remainder of the moisture being removed from the silica during its passage through the inner wall.

The invention is hereinafter more fully described and claimed, and illustrated in the accompanying drawings, wherein:—

Figure 1 is a view in side elevation of a drying machine constructed in accordance with my invention.

Figure 2 is a sectional view on an enlarged scale taken on the vertical plane indicated by the line 2—2 of Figure 1.

Figure 3 is a sectional view on an enlarged scale taken on a vertical plane extending centrally and longitudinally through the drying machine.

Figure 4 is a view in rear elevation of the drying machine.

Figure 5 is a sectional view on an enlarged scale taken on the vertical plane indicated by the line 5—5 of Figure 1, and Figure 6 is a sectional view on an enlarged scale of one of the nozzles of the means for applying the silica to the outer drum wall.

Referring in detail to the drawings, 1 designates the drum of the drying machine. The drum 1 is horizontally disposed, and comprises outer and inner cylindrical walls 2 and 3, respectively, which are arranged in close concentric relation. The drum 1 is supported for rotation about its longitudinal axis by means comprising shafts 4 journaled in bearings 5, rollers 6 mounted on the shafts, and bands 7 surrounding and secured to the outer drum wall 2 and engaging the rollers.

The drum walls 2 and 3 are imperforate, and are concentrically related. They are relatively spaced to provide therebetween a chamber 8 for the medium employed to heat them. The chamber 8 is closed at its ends, as at 9. Arranged within the chamber 8 in contact with the drum walls 2 and 3, is a spiral portion 10 which causes the heating medium to flow in a spiral path through the chamber to the end that every portion of the drum walls may be heated. The drum 1 is closed at its front end by a head 11 and at its rear end by a head 12. A pipe 13 extends axially through the head 11, and a pipe 14 extends axially through the head 12. The pipes 13 and 14 are closed at their inner ends and are supported from the drum wall 3 by spiders 15 and 16, respectively. A tube 17 extends from the pipe 13 to the front end of the spiral chamber 8, and a tube 18 extends from the pipe 14 to the rear end of the chamber. The tube 17 conveys the heating medium, which is preferably steam, from the pipe 13 to the spiral chamber 8. After passing throughout the entire length of the spiral chamber 8, the heating medium is conveyed by the tube 18 to the pipe 14. A pipe 19 conveys the heating medium from its source of supply, not shown, to the pipe 13, and a pipe 20 conveys the heating medium from the pipe 14 back to the source of supply, condenser or the like. The pipes 13 and 14 are rotatable with respect to the pipes 19 and 20, and packing glands 21 establish steam tight connections between the pipes 13 and 14 and the pipes 19 and 20.

A motor, not shown, of any suitable type may be connected by means, not shown, also any suitable type, to one of the shafts 4 for the purpose of rotating the drum 1.

The drum 1 rotates in the direction indicated by the arrow of Figure 2. The silica is sprayed onto the outer surface of the drum wall 2 between the bands 7 and between the ends of this wall and the bands. The silica is applied to these three sections of the drum wall 2 by means which are similar and each of which comprises a nozzle 22 and a pipe 23. The nozzles 22, which are located near the upper sides of the drum wall sections and extend longitudinally thereof, are closed at their ends, and are provided in their inner sides with longitudinally extending discharge slots 24. The pipes 23 convey the silica from a bin or other storage receptacle, not shown, to the nozzles 22, the bin or other storage receptacle being preferably located above the drying machine so as to cause the silica to feed by gravity to the nozzles, and to feed by gravity from the nozzles to the drum wall sections. The pipes 3 serve to support the nozzles 22.

Scrapers 25 contact with the sections of the drum wall 2 when below the nozzles 22, and serve to remove the silica from the drum wall sections. The scrapers 25 extend longitudinally of the drum wall sections, and are supported by standards 26. The silica is spread from the drum wall sections and is directed by guide plates 27 onto the concave conveyor belt 28. The guide plates 27 are located below the scrapers 25, and are supported from the standards 26 by arms 29. Each drum wall section is provided with a scraper 25 and a guide plate 27, and these parts extend longitudinally of each drum wall section. The conveyor belt 28 extends from one end of the drum 1 to the other end thereof, and is supported by concave rollers 30 mounted on shafts 31 carried by standards 32.

The conveyor belt 28 may be driven by any suitable means, not shown, from the shaft 4 to which the motor is connected, and it is driven in such manner as to cause its upper run to move in the direction of the front end of the drum 1. The silica, from which substantially all of the moisture was removed before it was delivered to the conveyor belt 28, is delivered from the conveyor belt to a hopper 33 located below the turn of the conveyor belt at the front end of the drum 1. A screw conveyor 34, the shaft 35 of which may be driven by any suitable means, not shown, from the shaft 4 connected to the motor, conveys the silica from the hopper 33 to a spout 36 which passes through the front head 11 of the drum 1 and which in turn delivers the silica into the inner drum wall 3. A spiral conveyor 37 located within and fixed to the drum wall 3 extends from the front end of this drum wall to the rear end thereof and conveys the silica rearwardly through this drum wall. The rear head 12 of the drum 1 is provided with an annular chamber 38 which contacts with the interior of the drum wall 3 and into which the spiral conveyor 37 forces the silica. A spout 39 extending downwardly and rearwardly from the head 12 conveys the silica from the chamber 38 to a trough, not shown. The silica may be conveyed from this trough by a conveyor, not shown, to the place where it is to be sacked or stored. In order to insure the delivery of the silica from the drum wall 3 to the chamber 38, this drum wall is provided at its rear end with an extension which enters the chamber.

The vapor formed within the drum wall 3 as the result of the silica therein, is conveyed from the drum wall by a flue 40 which communicates at its lower end with a box 41 passing through the drum head 12 and communicating with the interior of the drum wall 3. The drum wall 2 is fixed, and it together with the box 41 is supported by a standard 42.

From the foregoing description, taken in connection with the accompanying drawings, it will be understood that in practice, the silica is applied to the outer surface of the drum wall 2, that the silica is removed from the drum wall at a point below its point of application thereto, and that the greater portion of the moisture of the silica will be removed while the silica is on the drum wall. As the silica is removed from the drum wall 2 it falls onto the conveyor belt 28 which delivers it to the conveyor 34 for delivery into the drum wall 3 at the front end of the latter. The spiral conveyor 37 slowly moves the silica from the front end of the drum wall 3 to the rear end thereof. During its entire passage therethrough, the silica contacts with the drum wall 3 with the result that the remainder of its moisture content is driven therefrom, the silica leaving the drum wall 3 by way of the spout 39 and the vapor leaving this drum wall by way of the flue 40. The heating medium constantly flows through the chamber 8 between the drum walls 2 and 3. In view of the spiral formation of this chamber the heating medium flows therethrough in a manner to maintain every part of the drum walls 2 and 3 at the temperature required to remove the moisture from the silica.

While I have described the principle of the invention, together with the structure which I now consider the preferred embodiment thereof, it is to be understood that the structure shown is merely illustrative and that such changes may be made, when desired, as fall within the scope of the invention as claimed.

What is claimed is:—

1. A machine for drying comminuted material, comprising a rotatable drum having outer and inner cylinder walls spaced to provide therebetween a chamber for a heating medium for the walls, means for applying the material to the outer surface of the outer wall, means for removing the material from the outer wall, means for delivering the material removed from the outer wall to the interior of the inner wall, and means for causing the material to move from one end to the other of the inner wall.

2. A machine for drying comminuted material, comprising a rotatable drum having outer and inner cylindrical walls spaced to provide therebetween a chamber for a heating medium for the walls, means for applying the material to the outer surface of the outer wall, means for removing the material from the outer wall after it has been applied on said wall during a substantially complete revolution thereof, means conveying the material removed from the outer wall into the inner wall at a point near one end of the latter, and means for moving the material in the direction of the other end of the inner wall.

3. A machine for drying comminuted material, comprising a rotatable drum having outer and inner cylindrical walls spaced to provide therebetween a chamber for a heating medium for the walls, means for applying the material to the outer surface of the outer wall, means for removing the material from the outer wall after it has been applied on said wall during a substantially complete revolution thereof, means conveying the material removed from the outer wall into the inner wall at a point near one end of the latter, and a spiral conveyor within the inner wall for moving the material in the direction of the other end thereof.

4. A machine for drying comminuted material, comprising a rotatable drum having outer and inner cylindrical walls spaced to provide therebetween a chamber for a heating medium for the walls, nozzles outwardly of and extending longitudinally of the outer wall and adapted to deliver the material to the outer surface of said wall, a conveyor located outwardly of and extending longitudinally of the outer wall, means for removing the material from the outer wall and directing it onto the conveyor, means receiving the material from the conveyor and delivering it into the inner wall, and a spiral conveyor within the inner wall for forcing the material longitudinally therethrough.

5. A machine for drying comminuted material comprising a rotatable drum having outer and inner walls spaced to provide therebetween a chamber for a heating medium for the walls, front and rear heads closing the ends of the drum, means for applying the material to the outer surface of the outer wall, means for removing the material from the outer wall, a spout extending through the front head into the inner wall, means conveying the removed material to the spout, a spiral conveyor within the inner wall for forcing the material toward the rear head, a spout carried by the rear head to convey the material from the inner wall, and a flue communicating with the inner wall.

6. A machine for drying comminuted material comprising a rotatable drum, means through the medium of which the inner and outer surfaces of the drum may be heated, means for applying the material to the outer surface of the drum, means for removing the material from said surface, means directing the removed material to the interior of the drum, and a spiral conveyor located within the drum for moving the material longitudinally therethrough.

In testimony whereof I hereunto affix my signature.

CLAUD H. BURRIS.